Patented Nov. 17, 1931

1,832,593

UNITED STATES PATENT OFFICE

JOSEF SZÜCS, OF VIENNA, AUSTRIA

PROCESS FOR THE CULTIVATION OF EDIBLE FUNGI

No Drawing. Application filed April 23, 1927, Serial No. 186,172, and in Austria May 6, 1926.

This invention relates to the cultivation of edible fungi, especially mushrooms.

In the cultivation of edible fungi, more particularly mushrooms, success is dependent upon the personal experience and skill of the cultivator. Technical mycology has made no contribution to the improvement of methods hitherto resorted to. It is possible to distinguish germinating from non-germinating spores, or diseased from healthy mushroom spawn or mycelium, but it has not hitherto been possible to co-ordinate a normal or an irregular fungi activity with positively detectable developments within the culture bed, so that correct progress of the culture cannot be controlled with certainty even by the most skilled cultivator. As regards the nutritive substratum, the culture of mushrooms is limited to the use of horse manure, preferably mixed with straw. Moreover, the suitability of such manure for this purpose is highly dependent upon the food given to the horses and upon careful manipulation of the material. The manure must moreover be "preparated" in a particular way in order to reach the proper condition to be made up in the form of the bed. It is known that the success of the culture depends upon a correct and complete development of this fermentation or preparation of the compost, lasting 10 to 20 days, without there being any theoretical knowledge as to the control of this important preliminary work. Finally, the culture as carried out in the usual way, is highly endangered by plant parasites and animal enemies.

In the course of studies concerning the conditions of vegetation of pileated mushrooms the surprising observation was made that it is not the specific nutrient value of the substratum which is absolutely essential for the growing of most edible mushrooms, but that the edible fungi are as tolerant in this matter as the common hyphomycetes. In contrast with the predominating belief, the culture of edible mushrooms is by no means rendered more difficult by the peculiarities of the method of nutrition. It has been found that the preparatory fermentation of horse manure in the culture of mushrooms has for its exclusive purpose to assure the predomination of the mushrooms over other lower organisms; otherwise the mushroom spawn is displaced by other micro-organisms such as hyphomycetes and bacteria, yeast and the like, in accordance with the composition of the nutrient medium. The reason why horse manure is particularly suitable for the culture of mushrooms is that this source of nutrition contains those micro-organisms which by spontaneous fermentation protect the spawned beds against swarming with foreign micro-organisms injurious to mycelial development.

According to the present invention, the same result is obtained by mixing solid or semi-solid carrier materials (such as peat, straw, saw-dust, earth, dry leaves, pumice stone, agar-agar and the like, or mixtures of such materials) with nutrient solutions containing organic substances especially carbohydrates and nourishing salts, more particularly salts containing phosphorus and nitrogen. These materials are then infected with pure or mixed cultures of bacteria or mold fungi or the like suitable for producing a fermentation like that of horse manure. If circumstances are favourable, there is of course no objection to this kind of fermentation being spontaneous. Although not absolutely necessary, it is advisable to sterilize the nutrient medium after fermentation is completed. If the spawn is now inserted into the beds, the edible mushroom grows as on prepared horse manure, but in a shorter time and in more favourable conditions.

Apparently, the preliminarily fermented manure or a nutrient medium of other kind which has been transformed as described by bacterial action, is rendered immune by the products of life of the micro-organisms under consideration against a subsequent development of the same micro-organisms and varieties thereof. The culture beds remain fully protected from infections when the ferementation of the nutrient substratum is produced for example by hyphomycetes and is carried to a stage of ample development. It has been found preferable to use, for starting the fermentation of the nutrient medium, those organisms which cause infection in the culture of edible mushrooms, if the fermentation of the nutritive substratum has not reached the desired final stage. It might be mentioned, in order to show how non-specifically the fermentation of the nutrient medium may be carried out, that out of nine species of aspergillus experimented upon, none proved to be unsuitable for preparing the substratum for subsequent culture of mushrooms, that is to say for bringing the medium in proper conditions to be spawned. Furthermore, it has been possible to isolate from horse manure a number of bacteria which cannot be morphologically defined and which are suitable without exception, for producing the preliminary fermentation. The medium may likewise be infected with horse manure.

Molasses is preferably used as nutrient solution containing carbo-hydrates, but other raw material and waste products from the pressed yeast and alcohol industry are suitable therefor, such as for example saccharified cereal wort and spent wash; also sulphite-cellulose lye and the like.

*Example.*—55 kilograms of dry peat or thoroughly mixed with 20 kilograms of molasses, 0.7 kilograms of superphosphate and 0.2 kilograms of ammonium sulphate and inoculated with an aspergillus species such as for example aspergillus bruneus after the hydrogen ion concentration is adjusted to about $h=10^{-2}$. Should the peat be more acid, its acidity should be correspondingly lowered by the addition of alkali or earth-alkali. The peat may of course be completely neutralized and thereafter suitably acidified by the addition of organic or inorganic acids. Preliminary fermentation with a rapidly growing species of aspergillus lasts from two of five days, the temperature rising to 70° C. The fermented substratum is then suitably sterilized, preferably by heat, and thereafter inoculated or "spawned" by direct spore-culture methods (with spores, or preliminarily germinated spores) or with mycelium not directly derived from spores. The culture is allowed to develop at a room temperature of 25 to 30° C., the minute care involved in the usual culture of mushrooms being unnecessary. The fungi develop uniformly and in a pure state without being endangered by vegetable and animal enemies such as snails, centipedes or worms. The specific features of the cultivated varieties are maintained with remarkable steadiness. The peat may be used at least thrice. The development is completed in as many weeks as there are months required for example for the culture of open air or cellar mushrooms.

In the German Patent No. 60,883 a method for cultivating mushrooms is described, which method consists in that the nutriment is furnished to the spawn inserted in triturated peat and comminuted straw or the like by means of a nutrient solution composed of Chile saltpeter (nitrate of soda), sulphate of ammonia, phosphate of potash and rain water or distilled water. This process aims at producing a succedaneum of or substitute for the prepared horse manure by imitating the nutrimental conditions of the latter, that is by incorporating comminuted fibrous peat or the like with appropriate mineral nutrient salts. In contradistinction thereto the present method starts from the new knowledge that the usual preparation of the horse manure has to fulfil the task of assuring the predominance of the fungi in question over other lower organisms by the vital action of appropriate micro-organisms. Consequently the present invention essentially consists of rendering solid or semi-solid carrier substances suitable for the growth of the mushrooms by a bacterial pretreatment. In effecting this method the supply of organic nutrient substances is an essential condition. In the said German patent there is neither a fermentative pretreatment of the fibrous peat or the like mentioned nor an addition of organic nutrients. The low content of assimilable carbo-hydrates contained in the peat does not permit the use of peat for the culture of edible fungi without the addition of suitable organic substances.

I claim:

1. A process of cultivating edible fungi which consists in mixing a solid carrier material with a nutrient solution other than horse manure or liquid constituents thereof, prepared by incorporating a solution of assimilable organic substances with well defined nourishing salts, bringing on this artificial culture medium microorganisms to predominance having the property of provoking a fermentation similar to that of horse manure preparation apart from natural horse manure, and, after fermentation is completed, spawning this nutrient medium in the usual way.

2. A process of cultivating edible fungi which consists in mixing a solid carrier material with a nutrient solution other than horse manure or liquid constituents thereof, prepared by incorporating a solution of carbohydrate materials with well defined nourishing salts, bringing on this artificial culture medium microorganisms to predominance having the property of provoking a fermentation similar to that of natural horse manure preparation apart from natural horse manure, and, after fermentation is completed, spawning this nutrient medium in the usual way.

3. A process of cultivating edible fungi which consists in mixing a solid carrier material with a nutrient solution other than horse manure or liquid constituents thereof, prepared by incorporating a solution of assimilable organic substances with well defined nourishing salts, bringing on this artificial culture medium microorganisms to predominance having the property of provoking a fermentation similar to that of horse manure preparation apart from natural horse manure and after fermentation is completed sterilizing this nutrient medium and spawning the same in the usual way.

4. A process of cultivating edible fungi which consists in mixing a carrier material with an assimilable organic nutrient solution containing nourishing salts, initiating fermentation of this substratum by infecting it with microorganisms having the property of producing a fermentation similar to that of horse manure preparation, and after fermentation is completed sterilizing this nutrient medium by heat and spawning the same in the usual way.

5. A process of cultivating edible fungi which consists in mixing a solid carrier material with a nutrient solution other than horse manure or liquid constituents thereof, prepared by incorporating a solution containing carbohydrates with phosphatic and nitrogeneous salts, bringing on this artificial culture medium microorganisms to predominance having the property of provoking a fermentation similar to that of horse manure preparation apart from natural horse manure and, after fermentation is completed, spawning this nutrient medium in the usual way.

6. A process of cultivating edible fungi which consists in mixing a solid carrier material with a nutrient solution other than horse manure or liquid constituents thereof, prepared by incorporating a solution containing carbohydrates with phosphatic and nitrogeneous salts, bringing on this artificial culture medium microorganisms to predominance having the property of provoking a fermentation similar to that of horse manure preparation apart from natural horse manure and, after fermentation is completed, sterilizing this nutrient medium and spawning the same in the usual way.

7. A process of cultivating edible fungi which consists in mixing peat with a nutrient solution other than horse manure or liquid constituents thereof, prepared by incorporating a solution of assimilable organic substances with well defined nourishing salts, bringing on this artificial culture medium microorganisms to predominance having the property of provoking a fermentation similar to that of horse manure preparation apart from natural horse manure, and after fermentation is completed sterilizing this nutrient medium by heat and spawning the same in the usual way.

8. A process of cultivating edible fungi which consists in mixing peat with a nutrient solution other than horse manure or liquid constituents thereof, prepared by incorporating a solution containing carbohydrates with phosphatic and nitrogeneous salts, bringing on this artificial culture medium microorganisms to predominance having the property of provoking a fermentation similar to that of horse manure preparation apart from natural horse manure, and after fermentation is completed sterilizing this nutrient medium by heat and spawning the same in the usual way.

9. A process of cultivating edible fungi which consists in mixing peat with molasses and phosphatic and nitrogenous salts, initiating fermentation of this substratum by infecting it with micro-organisms having the property of producing a fermentation similar to that of horse manure preparation, and after fermentation is completed sterilizing this nutrient medium and spawning the same in the usual way.

10. A process of cultivating edible fungi which consists in mixing peat with molasses, superphosphate and ammonium sulphate, initiating fermentation of this substratum by infecting it with micro-organisms having the property of producing a fermentation similar to that of horse manure preparation, and after fermentation is completed sterilizing this nutrient medium and spawning the same in the usual way.

11. A process of cultivating edible fungi which consists in mixing a solid carrier material with a nutrient solution other than horse manure or liquid constituents thereof, prepared by incorporating a solution of assimilable organic substances with well defined nourishing salts, bringing on this artificial culture medium microorganisms of the species aspergillus to predominance, and after fermentation is completed, spawning this nutrient medium in the usual way.

12. A process of cultivating edible fungi which consists in mixing peat with molasses, superphosphate and ammonium sulphate, initiating fermentation of this substratum by infecting it with a species of aspergillus, and after fermentation is completed spawning this nutrient medium in the usual way.

13. A process of cultivating edible fungi which consists in mixing peat with molasses, superphosphate and ammonium sulphate, adjusting the hydrogen ion concentration to about $h=10^{-2}$, initiating fermentation of this nutrient medium by infecting it with aspergillus bruneus, and after fermentation is completed sterilizing this nutritive substratum by heat and spawning it in the usual way.

14. A culture for producing edible fungi as a new article of manufacture, which consists of a solid carrier material mixed with a nutrient solution other than horse manure or liquid constituents thereof, prepared by incorporating a solution of assimilable organic substances with well defined nourishing salts, fermented by the action of microorganisms having the property of provoking a fermentation similar to that of horse manure preparation and containing the fungi in the development stage of the mycelium.

15. A culture for producing edible fungi as a new article of manufacture, which consists of a solid carrier material mixed with a nutrient solution other than horse manure or liquid constituents thereof, prepared by incorporating a solution of carbohydrates with phosphatic and nitrogeneous salts, fermented by the action of microorganisms having the property of provoking a fermentation similar to that of horse manure preparation and containing the fungi in the development stage of the mycelium.

16. A culture for producing edible fungi as a new article of manufacture, which consists of a solid carrier material mixed with a nutrient solution other than horse manure or liquid constituents thereof, prepared by incorporating a solution of assimilable organic substances with well defined nourishing salts, fermented by the action of microorganisms of the species aspergillus and containing the fungi in the development state of the mycelium.

In testimony whereof I have affixed my signature.

JOSEF SZÜCS.